(12) United States Patent
Miess et al.

(10) Patent No.: US 10,350,730 B2
(45) Date of Patent: Jul. 16, 2019

(54) POLYCRYSTALLINE DIAMOND COMPACTS INCLUDING AT LEAST ONE TRANSITION LAYER AND METHODS FOR STRESS MANAGEMENT IN POLYCRYSTALLINE DIAMOND COMPACTS

(71) Applicant: US SYNTHETIC CORPORATION, Orem, UT (US)

(72) Inventors: David P. Miess, Highland, UT (US); Kenneth E. Bertagnolli, Riverton, UT (US); Damon B. Crockett, Mapleton, UT (US); Arnold D. Cooper, Mapleton, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 390 days.

(21) Appl. No.: 14/246,657

(22) Filed: Apr. 7, 2014

(65) Prior Publication Data
US 2014/0215926 A1    Aug. 7, 2014

Related U.S. Application Data

(62) Division of application No. 13/087,775, filed on Apr. 15, 2011, now Pat. No. 8,727,046.

(51) Int. Cl.
*B01J 3/06*    (2006.01)
*B24D 18/00*    (2006.01)
(Continued)

(52) U.S. Cl.
CPC .............. *B24D 3/007* (2013.01); *B01J 3/062* (2013.01); *B24D 18/0009* (2013.01);
(Continued)

(58) Field of Classification Search
CPC .......... B24D 18/0009; B32B 5/00; B01J 3/06; B01J 3/062; E21B 10/567; E21B 10/5735; B22F 7/00
See application file for complete search history.

(56) References Cited

U.S. PATENT DOCUMENTS

| 3,101,260 A | 8/1963 | Cheney |
| 3,141,746 A | 7/1964 | De Lai |

(Continued)

FOREIGN PATENT DOCUMENTS

| CN | 1249221 | 4/2000 |
| CN | 101321714 | 12/2008 |

(Continued)

OTHER PUBLICATIONS

U.S. Appl. No. 12/858,906, Oct. 7, 2015, Office Action.
(Continued)

*Primary Examiner* — Pegah Parvini
(74) *Attorney, Agent, or Firm* — Dorsey & Whitney LLP

(57) ABSTRACT

Embodiments relate to polycrystalline diamond compacts ("PDCs") that are less susceptible to liquid metal embrittlement damage due to the use of at least one transition layer between a polycrystalline diamond ("PCD") layer and a substrate. In an embodiment, a PDC includes a PCD layer, a cemented carbide substrate, and at least one transition layer bonded to the substrate and the PCD layer. The at least one transition layer is formulated with a coefficient of thermal expansion ("CTE") that is less than a CTE of the substrate and greater than a CTE of the PCD layer. At least a portion of the PCD layer includes diamond grains defining interstitial regions and a metal-solvent catalyst occupying at least a portion of the interstitial regions. The diamond grains
(Continued)

and the catalyst collectively exhibit a coercivity of about 115 Oersteds or more and a specific magnetic saturation of about 15 Gauss·cm³/grams or less.

20 Claims, 9 Drawing Sheets

(51) Int. Cl.
| | |
|---|---|
| B32B 18/00 | (2006.01) |
| B24D 3/00 | (2006.01) |
| C04B 35/56 | (2006.01) |
| C04B 37/00 | (2006.01) |
| C04B 37/02 | (2006.01) |
| C22C 26/00 | (2006.01) |
| F16C 33/04 | (2006.01) |
| C04B 35/528 | (2006.01) |
| C04B 35/645 | (2006.01) |
| E21B 10/567 | (2006.01) |
| E21B 10/573 | (2006.01) |
| C04B 35/5831 | (2006.01) |
| B22F 5/00 | (2006.01) |

(52) U.S. Cl.
CPC ............ *B32B 18/00* (2013.01); *C04B 35/528* (2013.01); *C04B 35/5607* (2013.01); *C04B 35/5626* (2013.01); *C04B 35/5831* (2013.01); *C04B 35/645* (2013.01); *C04B 37/006* (2013.01); *C04B 37/026* (2013.01); *C22C 26/00* (2013.01); *E21B 10/567* (2013.01); *E21B 10/5735* (2013.01); *F16C 33/043* (2013.01); *B01J 2203/063* (2013.01); *B01J 2203/0655* (2013.01); *B22F 2005/001* (2013.01); *C04B 2235/386* (2013.01); *C04B 2235/3839* (2013.01); *C04B 2235/3847* (2013.01); *C04B 2235/405* (2013.01); *C04B 2235/427* (2013.01); *C04B 2235/5436* (2013.01); *C04B 2235/96* (2013.01); *C04B 2235/9607* (2013.01); *C04B 2237/08* (2013.01); *C04B 2237/083* (2013.01); *C04B 2237/086* (2013.01); *C04B 2237/12* (2013.01); *C04B 2237/363* (2013.01); *C04B 2237/401* (2013.01); *C04B 2237/58* (2013.01); *C04B 2237/61* (2013.01); *F16C 2206/04* (2013.01); *F16C 2352/00* (2013.01)

(56) References Cited

U.S. PATENT DOCUMENTS

| | | | |
|---|---|---|---|
| 3,574,580 A | 4/1971 | Stromberg et al. | |
| 3,829,544 A | 8/1974 | Hall | |
| 3,909,647 A | 9/1975 | Peterson | |
| 4,268,276 A | 5/1981 | Bovenkerk | |
| 4,403,015 A | 9/1983 | Nakai et al. | |
| 4,410,054 A | 10/1983 | Nagel et al. | |
| 4,425,315 A | 1/1984 | Tsuji et al. | |
| 4,468,138 A | 8/1984 | Nagel | |
| 4,525,178 A | 6/1985 | Hall | |
| 4,560,014 A | 12/1985 | Geczy | |
| 4,604,106 A | 8/1986 | Hall et al. | |
| 4,610,600 A | 9/1986 | Bleier | |
| 4,610,699 A | 9/1986 | Yazu et al. | |
| 4,636,253 A | 1/1987 | Nakai et al. | |
| 4,643,741 A | 2/1987 | Yu et al. | |
| 4,694,918 A | 9/1987 | Hall | |
| 4,738,322 A | 4/1988 | Hall et al. | |
| 4,729,440 A | 5/1988 | Hall | |
| 4,811,801 A | 3/1989 | Salesky et al. | |
| 4,913,247 A | 4/1990 | Jones | |
| 5,016,718 A | 5/1991 | Tandberg et al. | |
| 5,092,687 A | 3/1992 | Hall | |
| 5,120,327 A | 6/1992 | Dennis | |
| 5,135,061 A | 8/1992 | Newton, Jr. et al. | |
| 5,151,107 A | 9/1992 | Cho et al. | |
| 5,154,245 A | 10/1992 | Waldenstrom et al. | |
| 5,355,969 A | 10/1994 | Hardy et al. | |
| 5,364,192 A | 11/1994 | Damm et al. | |
| 5,368,398 A | 11/1994 | Damm et al. | |
| 5,370,195 A | 12/1994 | Keshavan et al. | |
| 5,460,233 A | 10/1995 | Meany et al. | |
| 5,469,927 A | 11/1995 | Griffin | |
| 5,480,233 A | 1/1996 | Cunningham | |
| 5,544,713 A | 8/1996 | Dennis | |
| 5,605,199 A | 2/1997 | Newton | |
| 5,769,176 A | 6/1998 | Sumiya et al. | |
| 5,848,348 A | 12/1998 | Dennis | |
| 5,875,862 A * | 3/1999 | Jurewicz ............. E21B 10/5735 | 175/432 |
| 5,889,219 A | 3/1999 | Moriguchi et al. | |
| 6,090,343 A | 7/2000 | Kear et al. | |
| 6,132,675 A | 10/2000 | Corrigan et al. | |
| 6,145,607 A | 11/2000 | Griffing et al. | |
| 6,189,634 B1 | 2/2001 | Bertagnolli et al. | |
| 6,220,375 B1 * | 4/2001 | Butcher ................... B22F 7/06 | 175/428 |
| 6,227,318 B1 | 5/2001 | Siracki | |
| 6,241,035 B1 | 6/2001 | Portwood | |
| 6,290,008 B1 | 9/2001 | Portwood et al. | |
| 6,338,754 B1 | 1/2002 | Cannon et al. | |
| 6,342,301 B1 | 1/2002 | Yoshida et al. | |
| 6,408,959 B2 | 6/2002 | Bertagnolli et al. | |
| 6,443,248 B2 | 9/2002 | Yong et al. | |
| 6,460,637 B1 | 10/2002 | Siracki et al. | |
| 6,655,234 B2 | 12/2003 | Scott | |
| 6,749,033 B2 | 6/2004 | Griffin et al. | |
| 6,793,681 B1 | 9/2004 | Pope et al. | |
| 6,913,633 B2 | 7/2005 | Fries et al. | |
| 6,915,866 B2 | 7/2005 | Middlemiss | |
| 6,987,318 B2 | 1/2006 | Sung | |
| 7,108,598 B1 | 9/2006 | Galloway | |
| 7,216,661 B2 | 5/2007 | Welty et al. | |
| 7,350,601 B2 | 4/2008 | Belnap et al. | |
| 7,435,478 B2 | 10/2008 | Keshavan | |
| 7,462,003 B2 | 12/2008 | Middlemiss | |
| 7,493,972 B1 | 2/2009 | Schmidt et al. | |
| 7,516,804 B2 | 4/2009 | Vail | |
| 7,517,589 B2 | 4/2009 | Eyre | |
| 7,543,662 B2 | 6/2009 | Belnap et al. | |
| 7,552,782 B1 | 6/2009 | Sexton et al. | |
| 7,559,695 B2 | 7/2009 | Sexton et al. | |
| 7,575,805 B2 | 8/2009 | Achilles et al. | |
| 7,628,234 B2 | 12/2009 | Middlemiss | |
| 7,740,673 B2 | 6/2010 | Eyre | |
| 7,757,791 B2 | 7/2010 | Belnap et al. | |
| 7,866,418 B2 | 1/2011 | Bertagnolli et al. | |
| 8,020,645 B2 | 9/2011 | Bertagnolli et al. | |
| 8,158,258 B2 | 4/2012 | Bertagnolli et al. | |
| 8,197,936 B2 | 6/2012 | Keshavan | |
| 8,236,074 B1 | 8/2012 | Bertagnolli et al. | |
| 8,297,382 B2 | 10/2012 | Bertagnolli et al. | |
| 8,461,832 B2 | 6/2013 | Bertagnolli et al. | |
| 2002/0071729 A1 | 6/2002 | Middlemiss et al. | |
| 2004/0062928 A1 | 4/2004 | Raghavan et al. | |
| 2004/0140132 A1 | 7/2004 | Middlemiss | |
| 2005/0050801 A1 | 3/2005 | Cho et al. | |
| 2005/0139397 A1 | 6/2005 | Achilles et al. | |
| 2005/0210755 A1 | 9/2005 | Cho et al. | |
| 2005/0262774 A1 | 12/2005 | Eyre et al. | |
| 2006/0038156 A1 | 2/2006 | Welty et al. | |
| 2006/0060392 A1 | 3/2006 | Eyre | |
| 2006/0157285 A1 | 7/2006 | Cannon et al. | |
| 2006/0162969 A1 | 7/2006 | Belnap et al. | |
| 2006/0165993 A1 | 7/2006 | Keshavan | |
| 2006/0180354 A1 | 8/2006 | Belnap et al. | |
| 2006/0266558 A1 | 11/2006 | Middlemiss et al. | |
| 2007/0014965 A1 | 1/2007 | Chodelka et al. | |
| 2007/0079994 A1 | 4/2007 | Middlemiss | |
| 2007/0181348 A1 | 8/2007 | Lancaster et al. | |

(56) References Cited

U.S. PATENT DOCUMENTS

| | | | |
|---|---|---|---|
| 2007/0187155 A1 | 8/2007 | Middlemiss | |
| 2007/0205023 A1 | 9/2007 | Hoffmaster et al. | |
| 2008/0022806 A1 | 1/2008 | Sumiya | |
| 2008/0023231 A1 | 1/2008 | Vail | |
| 2008/0115424 A1 | 5/2008 | Can et al. | |
| 2008/0142276 A1 | 6/2008 | Griffo et al. | |
| 2008/0178535 A1 | 7/2008 | Wan | |
| 2008/0185189 A1 | 8/2008 | Griffo et al. | |
| 2008/0206576 A1 | 8/2008 | Qian et al. | |
| 2008/0302579 A1 | 12/2008 | Keshavan et al. | |
| 2009/0152018 A1 | 6/2009 | Sani | |
| 2009/0208301 A1 | 8/2009 | Kuroda et al. | |
| 2010/0084196 A1* | 4/2010 | Bertagnolli | C22C 26/00 175/428 |
| 2010/0112332 A1 | 5/2010 | Kuroda et al. | |
| 2010/0186304 A1 | 7/2010 | Burgess et al. | |
| 2010/0242375 A1 | 9/2010 | Hall et al. | |
| 2010/0307069 A1 | 12/2010 | Bertagnolli et al. | |
| 2010/0330357 A1 | 12/2010 | Davies et al. | |
| 2011/0017517 A1 | 1/2011 | Scott et al. | |
| 2011/0031032 A1* | 2/2011 | Mourik | C22C 26/00 175/428 |
| 2011/0031033 A1* | 2/2011 | Mourik | C22C 26/00 175/428 |
| 2011/0031037 A1 | 2/2011 | Bellin et al. | |
| 2011/0042147 A1 | 2/2011 | Fang et al. | |
| 2011/0042149 A1 | 2/2011 | Scott et al. | |
| 2011/0072730 A1 | 3/2011 | Sithebe | |
| 2011/0083908 A1 | 4/2011 | Shen et al. | |
| 2011/0189468 A1 | 8/2011 | Bertagnolli et al. | |
| 2011/0192652 A1 | 8/2011 | Shen et al. | |
| 2012/0241226 A1 | 9/2012 | Bertagnolli et al. | |
| 2012/0261197 A1 | 10/2012 | Miess et al. | |
| 2013/0187642 A1 | 7/2013 | Bertagnolli et al. | |
| 2013/0205677 A1 | 8/2013 | Bertagnolli et al. | |
| 2013/0264125 A1 | 10/2013 | Miess et al. | |
| 2016/0207169 A1 | 7/2016 | Bertagnolli et al. | |

FOREIGN PATENT DOCUMENTS

| | | |
|---|---|---|
| EP | 0462955 | 12/1991 |
| GB | 2384260 | 7/2003 |
| JP | 121251 | 6/1985 |
| WO | WO 04/106004 | 12/2004 |
| WO | WO 06/099194 | 9/2006 |
| WO | WO 07/020518 | 2/2007 |
| WO | WO 2011/011290 | 1/2011 |
| WO | WO 2011/017592 | 2/2011 |

OTHER PUBLICATIONS

U.S. Appl. No. 13/085,689, Aug. 26, 2015, Issue Notification.
U.S. Appl. No. 13/486,578, Sep. 25, 2015, Office Action.
U.S. Appl. No. 13/486,578, Dec. 11, 2015, Notice of Allowance.
U.S. Appl. No. 13/909,193, Sep. 18, 2015, Office Action.
U.S. Appl. No. 13/087,775, Apr. 30, 2014, Issue Notification.
U.S. Appl. No. 13/789,099, Nov. 20, 2013, Office Action.
U.S. Appl. No. 13/789,099, Apr. 23, 2014, Office Action.
U.S. Appl. No. 12/858,906, Jul. 7, 2014, Office Action.
U.S. Appl. No. 12/858,906, Jan. 22, 2015, Office Action.
U.S. Appl. No. 12/858,906, May 18, 2015, Office Action.
U.S. Appl. No. 13/085,689, Jul. 3, 2014, Office Action.
U.S. Appl. No. 13/085,689, Jan. 22, 2015, Office Action.
U.S. Appl. No. 13/085,689, May 7, 2015, Notice of Allowance.
U.S. Appl. No. 13/486,578, Jul. 8, 2014, Office Action.
U.S. Appl. No. 13/486,578, Oct. 24, 2014, Office Action.
U.S. Appl. No. 13/486,578, May 7, 2015, Office Action.
U.S. Appl. No. 13/790,172, Jun. 11, 2014, Issue Notification.
U.S. Appl. No. 13/789,099, Oct. 23, 2014, Office Action.
U.S. Appl. No. 13/789,099, May 13, 2015, Office Action.
U.S. Appl. No. 12/608,155, filed Oct. 29, 2009, Sani.
U.S. Appl. No. 12/830,878, filed Jul. 6, 2010, Wiggins et al.
U.S. Appl. No. 13/275,372, filed Oct. 18, 2011, Mukhopadhyay.
U.S. Appl. No. 13/648,913, filed Oct. 10, 2012, Mukhopadhyay.
D.L. Decker, W.A. Basset, L. Merrill, H.T. Hall, and J.D. Barnett; "High-Pressure Calibration A Critical Review", J. Phys. Chem. Ref. Data, vol. 1, No. 3 (1972).
ASTM B887-03 (2008) "Standard Test Method for Determination of Coercivity (Hcs) of Cemented Carbides".
ASTM B886-03 (2008), "Standard Test Method for Determination of Magnetic Saturation (Ms) of Cemented Carbides".
W. Utsumi, N. Toyama, S. Endo, and F.E. Fujita, "X-ray diffraction under ultrahigh pressure generated with sintered diamond anvils", J. Appl. Phys., 60, 2201 (1986).
G. Rousse, S. Klotz, A.M. Saitta, J. Rodriguez-Carvajal, M.I. McMahon, B. Couzinet, and M. Mezouar, "Structure of the Intermediate Phase of PbTe at High Pressure", Physical Review B: Condensed Matter and Materials Physics, 71, 224116 (2005).
Tze-Pin Lin, Michael Hood, George A. Cooper, and Redd H. Smith, Residual Stresses in Polycrystalline Diamond Compacts, J. Am. Ceram. Soc. 77[6] pp. 1562-1568 (1994).
Dr Moyle, Er Kimmel "Utilization of magnetic saturation measurements for carbon control in cemented carbides" Dec. 1984, American Society of Metals Metals/Materials Technology series 1984 ASM/SCTE conference on technology advancements in cemented carbide production 8415-009.
Akashi et al; "Synthetis of Sintered Diamond with High Electrical Resistivity and Hardness"; J.Am. Ceram. Soc.; vol. 70, No. 10; 1987; pp. C-237-X-239.
Bochechka et al; "The Study of HP-HT Interaction between Co-Base Melts and Diamond Powders"; High Pressure Chemical Engineering; 1996; p. 457.
Ekimov et al.; "Sintering of a Nanodiamond in the Presence of Cobalt"; Inorganic Materials; vol. 45, No. 5; 2009; pp. 491-494.
Godick; "Message from Neil B. Godick"; PHLburg Technologies, Inc.; Oct. 2008.
Osipov et al; "A contribution to the study of the diamond solid state sintering."; *Ceramica*; vol. 49; 2003; pp. 151-157.
Shige et al; "Sintering of Diamond Powder Electroless-Plated with Co Metal", Science and Technology of New Diamond, pp. 251-255 (1990).
Tardim; "A Novel Method for Obtaining Polycrystalline Diamond Cutters"; Materials Science Forum; vols. 660-661; 2010; pp. 477-482.
German; "Particle Packing Characteristics", Metal Powder Industries Federation; pp. 101-103; 1989 (6 pages).
International Search Report and Written Opinion from International Application No. PCT/US2009/054398 dated Feb. 2, 2010.
International Search Report and Written Opinion from International Application PCT/US2010/059619 dated Mar. 4, 2011.
U.S. Appl. No. 12/244,960, Apr. 27, 2010, Office Action.
U.S. Appl. No. 12/244,960, Jun. 16, 2010, Office Action.
U.S. Appl. No. 12/244,960, Sep. 27, 2010, Notice of Allowance.
U.S. Appl. No. 12/244,960, Nov. 29, 2010, Notice of Allowance.
U.S. Appl. No. 12/244,960, Dec. 22, 2010, Issue Notification.
U.S. Appl. No. 12/690,998, Feb. 27, 2012, Office Action.
U.S. Appl. No. 12/690,998, Jul. 17, 2012, Notice of Allowance.
U.S. Appl. No. 12/690,998, Oct. 10, 2012, Issue Notification.
U.S. Appl. No. 12/785,014, Sep. 10, 2012, Office Action.
U.S. Appl. No. 12/785,014, Feb. 5, 2013, Notice of Allowance.
U.S. Appl. No. 12/785,014, May 22, 2013, Issue Notification.
U.S. Appl. No. 12/858,906, Oct. 5, 2012, Office Action.
U.S. Appl. No. 12/858,906, Apr. 10, 2013, Office Action.
U.S. Appl. No. 12/858,949, Dec. 23, 2010, Office Action.
U.S. Appl. No. 12/858,949, Jun. 8, 2011, Office Action.
U.S. Appl. No. 12/858,949, Jul. 28, 2011, Notice of Allowance.
U.S. Appl. No. 12/858,949, Aug. 31, 2011, Issue Notification.
U.S. Appl. No. 12/846,604, Aug. 8, 2011, Office Action.
U.S. Appl. No. 12/846,604, Feb. 27, 2012, Notice of Allowance.
U.S. Appl. No. 12/846,604, Mar. 28, 2012, Issue Notification.
U.S. Appl. No. 13/085,689, Mar. 15, 2013, Office Action.
U.S. Appl. No. 13/085,689, Jul. 17, 2013, Office Action.
U.S. Appl. No. 13/085,689, Oct. 30, 2013, Office Action.
U.S. Appl. No. 13/486,578, Sep. 20, 2013, Office Action.
U.S. Appl. No. 13/486,578, Jan. 13, 2014, Office Action.

(56) References Cited

OTHER PUBLICATIONS

U.S. Appl. No. 13/623,764, Jan. 14, 2013, Office Action.
U.S. Appl. No. 13/623,764, Apr. 16, 2013, Notice of Allowance.
U.S. Appl. No. 13/623,764, Jul. 29, 2013, Notice of Allowance.
U.S. Appl. No. 13/623,764, Dec. 11, 2013, Issue Notification.
U.S. Appl. No. 13/790,172, May 15, 2013, Office Action.
U.S. Appl. No. 13/790,172, Oct. 21, 2013, Office Action.
U.S. Appl. No. 13/790,172, Feb. 19, 2014, Notice of Allowance.
U.S. Appl. No. 13/087,775, Sep. 20, 2013, Office Action.
U.S. Appl. No. 13/087,775, Jan. 7, 2014, Notice of Allowance.
U.S. Appl. No. 12/961,787, filed Dec. 7, 2010, Mukhopadhyay, et al.
U.S. Appl. No. 13/027,954, filed Feb. 15, 2011, Miess, et al.
U.S. Appl. No. 13/037,548, filed Mar. 1, 2011, Gonzalez, et al.
U.S. Appl. No. 61/768,812, filed Feb. 25, 2013, Mukhopadhyay, et al.
U.S. Appl. No. 13/795,027, filed Mar. 12, 2013, Mukhopadhyay, et al.
U.S. Appl. No. 15/238,475, filed Aug. 16, 2016, Bertagnolli, et al.
U.S. Appl. No. 12/858,906, Dec. 23, 2015, Advisory Action.
U.S. Appl. No. 12/858,906, Apr. 7, 2016, Non-Final Office Action.
U.S. Appl. No. 12/858,906, Aug. 2, 2016, Notice of Allowance.
U.S. Appl. No. 12/858,906, Sep. 2, 2016, Corrected Notice of Allowance.
U.S. Appl. No. 13/486,578, Mar. 30, 2016, Issue Notification.
U.S. Appl. No. 13/789,099, May 19, 2016, Examiner's Answer.
U.S. Appl. No. 13/909,193, Feb. 18, 2016, Office Action.
U.S. Appl. No. 13/909,193, Jun. 28, 2016, Final Office Action.
U.S. Appl. No. 15/080,379, Jul. 29, 2016, Non-Final Office Action.
U.S. Appl. No. 13/919,142, Aug. 24, 2015, Restriction Requirement.
U.S. Appl. No. 13/919,142, Apr. 7, 2016, Non-Final Office Action.
U.S. Appl. No. 13/909,193, Oct. 7, 2016, Advisory Action.
U.S. Appl. No. 13/909,193, Jan. 6, 2017, Advisory Action.
U.S. Appl. No. 13/909,193, Feb. 2, 2017, Non-Final Office Action.
U.S. Appl. No. 15/080,379, Mar. 10, 2017, Final Office Action.
U.S. Appl. No. 15/238,475, Sep. 29, 2016, Non-Final Office Action.
U.S. Appl. No. 15/238,475, Jan. 12, 2017, Final Office Action.
U.S. Appl. No. 15/238,475, Apr. 24, 2017, Advisory Action.
U.S. Appl. No. 13/909,193, Oct. 6, 2017, Final Office Action.
U.S. Appl. No. 15/901,124, filed Feb. 21, 2018, Bertagnolli, et al.
U.S. Appl. No. 13/789,099, Oct. 2, 2017, Decision on Appeal.
U.S. Appl. No. 13/789,099, Feb. 26, 2018, Office Action.
U.S. Appl. No. 15/080,379, Feb. 28, 2018, Office Action.
U.S. Appl. No. 15/238,475, Dec. 29, 2017, Notice of Allowance.
U.S. Appl. No. 15/238,475, Mar. 14, 2018, Issue Notification.
U.S. Appl. No. 13/789,099, Jan. 4, 2019, Notice of Allowance.
U.S. Appl. No. 15/080,379, Dec. 28, 2018, Advisory Action.
U.S. Appl. No. 13/789,099, Oct. 16, 2018, Office Action.
U.S. Appl. No. 15/080,379, Sep. 17, 2018, Office Action.
U.S. Appl. No. 13/789,099, Apr. 8, 2019, Supplemental Notice of Allowance.
U.S. Appl. No. 13/789,099, Apr. 24, 2019, Issue Notification.

\* cited by examiner

POLYCRYSTALLINE DIAMOND COMPACTS INCLUDING AT LEAST ONE TRANSITION LAYER AND METHODS FOR STRESS MANAGEMENT IN POLYCRYSTALLINE DIAMOND COMPACTS

CROSS-REFERENCE TO RELATED APPLICATIONS

This application is a divisional of U.S. application Ser. No. 13/087,775 filed on 15 Apr. 2011, the disclosure of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in the formation of a matrix of bonded diamond grains having diamond-to-diamond bonding therebetween, with interstitial regions between the bonded diamond grains being occupied by the metal-solvent catalyst.

Despite the availability of a number of different types of PDCs, manufacturers and users of PDCs continue to seek PDCs with improved wear resistance, thermal stability, and manufacturability.

SUMMARY

Embodiments of the invention relate to a PDC that is less susceptible to brazing damage due to the use of at least one transition layer disposed between at least one PCD layer and a substrate thereof. It is currently believed that including the at least one transition layer between the PCD layer and the substrate may reduce the tensile stresses present in the substrate to make the substrate less susceptible to liquid metal embrittlement ("LME") and help reduce the tensile stresses generated in the PCD layer during brazing of the PDC to another structure such as a drill bit body to help prevent damage to the PCD layer during brazing. Methods for manufacturing a PDC that includes at least one transition layer between the PCD table and the substrate and embodiments utilizing the disclosed PDCs in various articles and apparatuses, such as rotary drill bits, bearing apparatuses, wire-drawing dies, machining equipment, and other articles and apparatuses are also disclosed.

In an embodiment, a PDC includes at least one PCD layer, a cemented carbide substrate, and at least one transition layer disposed between and bonded to the cemented carbide substrate and the PCD layer. The at least one transition layer is formulated with a coefficient of thermal expansion ("CTE") that is less than a CTE of the cemented carbide substrate and greater than a CTE of the polycrystalline diamond table. At least a portion of the at least one PCD layer includes a plurality of diamond grains defining a plurality of interstitial regions and a metal-solvent catalyst occupying at least a portion of the plurality of interstitial regions. The plurality of diamond grains and the metal-solvent catalyst collectively may exhibit a coercivity of about 115 Oersteds ("Oe") or more and a specific magnetic saturation of about 15 Gauss·cm$^3$/grams ("G·cm$^3$/g") or less.

In another embodiment, a method for manufacturing a PDC is described. The method includes disposing at least one layer that includes a plurality of diamond grains and at least one additive between at least one layer of diamond particles and a cemented carbide substrate in a pressure transmitting medium to form a cell assembly, and subjecting the cell assembly to an HPHT process of a temperature of at least 1000° C. and a pressure of at least 7.5 GPa in the pressure transmitting medium to form a PDC. The PDC so-formed includes at least one PCD layer, a cemented carbide substrate, and at least one transition layer disposed between the PCD layer and the cemented carbide substrate. The at least one transition layer exhibits a CTE that is less than a CTE of the cemented carbide substrate and greater than a CTE of the PCD layer.

Further embodiments relate to applications utilizing the disclosed PCD and PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to a PDC that is less susceptible to brazing damage due to the use of at least one transition layer disposed between at least one PCD layer and a substrate (e.g., a cemented carbide substrate) thereof. It is currently believed that including the at least one transition layer between the PCD layer and the substrate can reduce the stresses present in the substrate to make the substrate less susceptible to LME and help reduce the stresses generated in the PCD layer (e.g., during brazing of the PDC to another structure such as a drill bit body) to help prevent damage of the PCD layer. Methods for manufacturing a PDC that includes at least one transition layer between the PCD layer and the substrate and embodiments utilizing the disclosed PDCs in various articles and apparatuses, such as rotary drill bits, bearing apparatuses, wire-drawing dies, machining equipment, and other articles and apparatuses are also disclosed.

Figure 1A:
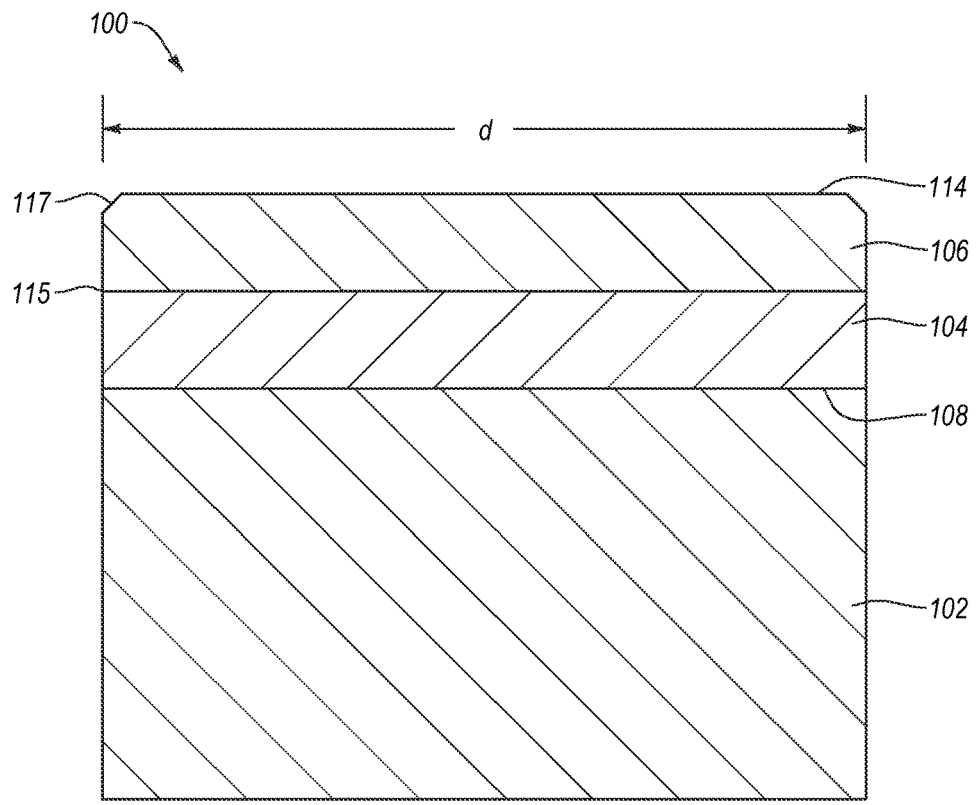
FIG. 1A is a cross-sectional view of a PDC that includes at least one PCD layer, a substrate, and at least one transition layer disposed between and bonded to the substrate and the PCD layer according to an embodiment.

Referring to FIG. 1A, an embodiment of a PDC 100 includes at least one PCD layer 106, a substrate 102, and at least one transition layer 104 disposed between and bonded to the substrate 102 and the PCD layer 106. The PCD layer 106 exhibits at least one working surface 114 having at least one lateral dimension "d" (e.g., a diameter), at least one lateral surface 115, and an optional chamfer 117 extending between the working surface 114 and the at least one lateral surface 115. Although FIG. 1A shows the working surface 114 as substantially planar, the working surface 114 may be concave, convex, or another non-planar geometry. The substrate 102 may be generally cylindrical or another selected configuration, without limitation. The substrate 102 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 102 comprises cobalt-cemented tungsten carbide.

The PCD layer 106 includes a plurality of diamond grains directly bonded together via diamond-to-diamond bonding (e.g., $sp^3$ bonding) to define a plurality of interstitial regions. At least a portion of the interstitial regions or, in some embodiments, substantially all of the interstitial regions may be occupied by a metal-solvent catalyst, such as iron, nickel, cobalt, or alloys of any of the foregoing metals. The PCD layer 106 may exhibit an average grain size of about 50 μm or less, such as about 30 μm or less or about 20 μm or less. For example, the average grain size of the diamond grains may be about 10 μm to about 18 μm and, in some embodiments, about 15 μm to about 25 μm. In some embodiments, the average grain size of the diamond grains may be about 10 μm or less, such as about 2 μm to about 5 μm or submicron.

According to various embodiments, when the PCD layer 106 is sintered at a pressure of at least about 7.5 GPa, the PCD layer 106 may exhibit a coercivity of 115 Oe or more, a high-degree of diamond-to-diamond bonding, a specific magnetic saturation about 15 G·cm$^3$/g or less, and a metal-solvent catalyst content of about 7.5 weight % ("wt %") or less. For example, the PCD layer 106 may exhibit a coercivity of 115 Oe or more, a high-degree of diamond-to-diamond bonding, a specific magnetic saturation about 15 G·cm$^3$/g or less, and a metal-solvent catalyst content of about 7.5 wt % or less, such as about 1 wt % to about 7.5 wt %, about 1 wt % to about 6 wt %, about 3 wt % to about 6 wt %, less than about 3 wt %, or a residual amount to about 1 wt %.

As discussed above, the metal-solvent catalyst that occupies at least a portion of the interstitial regions of the PCD layer 106 may be present in the PCD layer 106 in an amount of about 7.5 wt % or less, such as about 1 wt % to about 7.5 wt %, about 1 wt % to about 6 wt %, about 3 wt % to about 6 wt %, less than about 3 wt %, or a residual amount to about 1 wt %. By maintaining the metal-solvent catalyst content below about 7.5 wt %, the PCD layer 106 may exhibit a desirable level of thermal stability suitable for subterranean drilling applications.

As will be discussed in more detail in connection with FIG. 5 below, the transition layer 104 may help to reduce and/or moderate the residual tensile stresses in the substrate 102 generated during fabrication of the PDC 100 and may also help to reduce the thermal-induced tensile stresses generated in the PCD layer 106 during brazing of the PDC 100 to another structure such as a drill bit body. This is because the CTE of the transition layer 104 is specifically chosen to be less than that of the underlying substrate 102 and greater than that of the PCD layer 106. For example, the CTE of the transition layer 104 may be about 1.02 to about 5 times (e.g., about 1.2 to about 3, about 2 to about 3, or about 2.5 to about 3.5) greater than that of the PCD layer 106. For example, when the transition layer 104 includes about 2 vol % of tungsten carbide with the balance being substantially diamond grains and cobalt, the CTE may be 1.02 times greater than that of the PCD layer 106. As another example, when the transition layer 104 includes about 10 vol % of tungsten carbide with the balance being substantially diamond grains and cobalt, the CTE may be 1.1 times greater than the CTE of the PCD layer 106. As yet a further example, when the transition layer 104 includes about 20 vol % of tungsten carbide with the balance being substantially diamond grains and cobalt, the CTE may be 1.2 times greater than the CTE of the PCD layer 106. As the tensile stresses in the substrate 102 are reduced at least proximate to the interfacial surface 108 thereof, LME may be reduced and/or eliminated when the substrate 102 is brazed to another structure using a zinc-containing braze alloy that ordinarily can potentially cause LME. As the thermal-induced tensile stresses generated in the PCD layer 106 during brazing of the PDC 100 are reduced, damage to the PDC table 106 may also be reduced.

The transition layer 104 includes diamond grains and at least one additive that together define interstitial regions having the metal-solvent catalyst disposed in at least a portion of the interstitial regions. The at least one additive may be chosen from tungsten carbide particles, cemented tungsten carbide particles (e.g., individual particles formed of tungsten carbide particles cemented together with cobalt or a cobalt alloy), chromium carbide particles, cubic boron nitride crystals, or mixtures thereof. For example, the cemented tungsten carbide particles may be formed in by sintering, crushing the sintered product into a plurality of particles, and classified the crushed particles to a specific particle size range. The amount of the at least one additive present in the transition layer 104 may be about 1 volume % ("vol %") to about 80 vol % of the transition layer 104, such as about 1 vol % to about 50 vol %, about 1 vol % to about 5 vol %, about 2 vol % to about 5 vol %, about 1 vol % to about 10 vol %, about 3 vol % to about 10 vol %, about 2 vol % to about 10 vol %, about 10 vol % to about 25 vol %, about 25 vol % to about 50 vol %, or 10 vol % to about 25 vol %, with the balance substantially being diamond grains and metal-solvent catalyst. In some embodiments, the transition layer 104 may include about 10 vol % to about 80 vol % diamond grains (e.g., about 50 vol % to about 75 vol %) and about 1 wt % to about 7 wt % metal-solvent catalyst occupying the interstitial regions between the at least one additive and the diamond grains, and the balance substantially being the at least one additive (e.g., about 18 vol % to about 49 vol %). Depending upon the volume % of the at least one additive in the transition layer 104, the transition layer 104 so-formed may also exhibit diamond-to-diamond bonding between the diamond grains thereof when the volume % of the at least one additive is relatively low and may exhibit limited or substantially no diamond-to-diamond bonding when the volume % of the at least one additive is relatively high. In some embodiments, the PCD layer 106 may be substantially free of the at least one additive, while in other embodiments, a small amount of the at least one additive may migrate into the PCD layer 106 during formation thereof.

Many physical characteristics of the PCD layer 106 may be determined by measuring certain magnetic properties of the PCD layer 106 because the metal-solvent catalyst may be ferromagnetic. The amount of the metal-solvent catalyst present in the PCD layer 106 may be correlated with the measured specific magnetic saturation of the PCD layer 106. A relatively larger specific magnetic saturation indicates relatively more metal-solvent catalyst in the PCD layer 106.

The mean free path between neighboring diamond grains of the PCD layer 106 may be correlated with the measured coercivity of the PCD layer 106. A relatively large coercivity indicates a relatively smaller mean free path. The mean free path is representative of the average distance between neighboring diamond grains of the PCD layer 106 and, thus, may be indicative of the extent of diamond-to-diamond bonding between the diamond grains in the PCD layer 106. A relatively smaller mean free path, in well-sintered PCD, may indicate relatively more diamond-to-diamond bonding.

As merely one example, ASTM B886-03 (2008) provides a suitable standard for measuring the specific magnetic saturation and ASTM B887-03 (2008) e1 provides a suitable standard for measuring the coercivity of the PCD layer 106. Although both ASTM B886-03 (2008) and ASTM B887-03 (2008) e1 are directed to standards for measuring magnetic properties of cemented carbide materials, either standard may be used to determine the magnetic properties of PCD. A KOERZIMAT CS 1.096 instrument (commercially available from Foerster Instruments of Pittsburgh, Pa.) is one suitable instrument that may be used to measure the specific magnetic saturation and the coercivity of the PCD layer 106. To measure the magnetic properties of the PCD layer 106, the PCD layer 106 may be separated from the transition layer 104 and the substrate 102 by cutting along the interface between the PCD layer 106 and the transition layer 104 using electrical-discharge machining (e.g., wire electrical-discharge machining) and/or a grinding process.

Generally, as the sintering pressure that is used to form the PCD layer 106 increases, the coercivity of the PCD layer 106 may increase and the magnetic saturation may decrease. The PCD layer 106 defined collectively by the bonded diamond grains and the metal-solvent catalyst therein may exhibit a coercivity of about 115 Oe or more and a metal-solvent catalyst content of less than about 7.5 wt % as indicated by a specific magnetic saturation of about 15 $G \cdot cm^3/g$ or less. In a more detailed embodiment, the coercivity of the PCD layer 106 may be about 115 Oe to about 250 Oe and the specific magnetic saturation of the PCD layer 106 may be greater than zero $G \cdot cm^3/g$ to about 15 $G \cdot cm^3/g$. In an even more detailed embodiment, the coercivity of the PCD layer 106 may be about 115 Oe to about 175 Oe and the specific magnetic saturation of the PCD layer 106 may be about 5 $G \cdot cm^3/g$ to about 15 $G \cdot cm^3/g$. In yet an even more detailed embodiment, the coercivity of the PCD layer 106 may be about 155 Oe to about 175 Oe and the specific magnetic saturation of the PCD layer 106 may be about 10 $G \cdot cm^3/g$ to about 15 $G \cdot cm^3/g$. The specific permeability (i.e., the ratio of specific magnetic saturation to coercivity) of the PCD layer 106 may be about 0.10 $G \cdot cm^3/Oe \cdot g$ or less, such as about 0.060 $G \cdot cm^3/Oe \cdot g$ to about 0.090 $G \cdot cm^3/Oe \cdot g$. Despite the average grain size of the bonded diamond grains being less than about 50 µm, the metal-solvent catalyst content in the PCD layer 106 may still be less than about 7.5 wt % resulting in a desirable thermal stability.

A PCD layer formed by sintering diamond grains having the same diamond particle size distribution as a PCD embodiment of the invention, but sintered at a pressure of, for example, up to about 5.5 GPa and at temperatures in which diamond is stable may exhibit a coercivity of about 100 Oe or less and/or a specific magnetic saturation of about 16 $G \cdot cm^3/g$ or more. Thus, in one or more embodiments of the invention, the PCD layer 106 exhibits a metal-solvent catalyst content of less than 7.5 wt % and a greater amount of diamond-to-diamond bonding between diamond grains than that of a PCD layer sintered at a lower pressure, but with the same precursor diamond particle size distribution and catalyst.

Figure 1B:
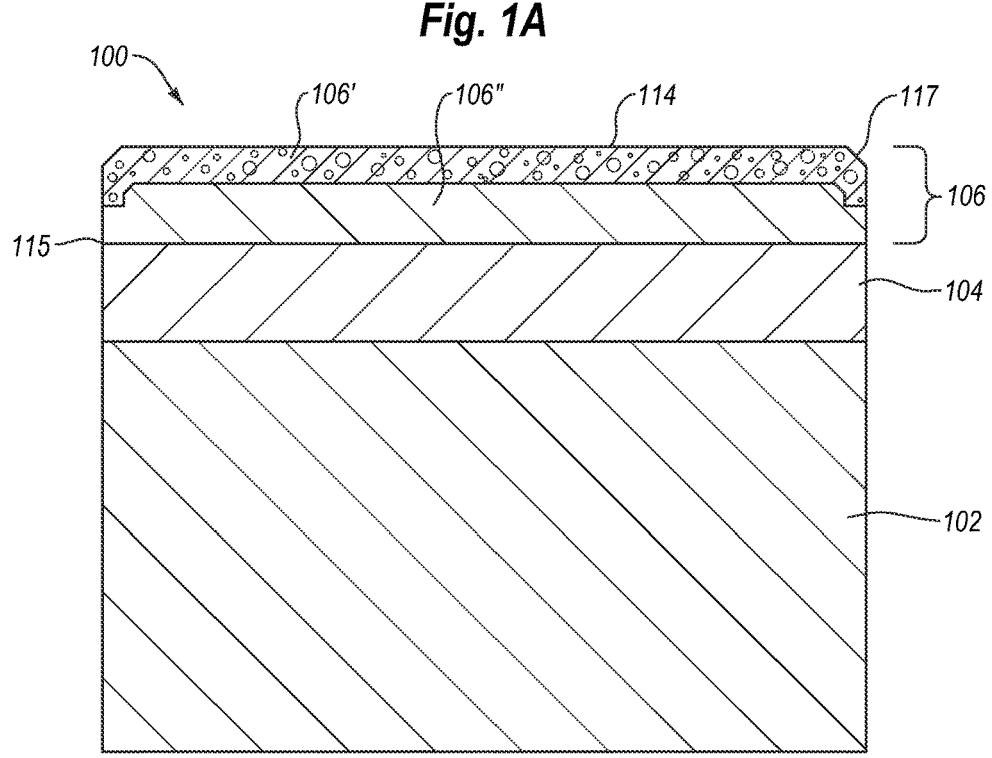
FIG. 1B is a cross-sectional view of the PDC shown in FIG. 1A after leaching the PCD layer according to an embodiment.

Referring to FIG. 1B, in some embodiments, at least the PCD layer 106 shown in FIG. 1A may be leached to deplete a portion of the metal-solvent catalyst therefrom. The metal-solvent catalyst may be at least partially removed in a leaching process to form a leached region 106' that extends inwardly from the working surface 114, the chamfer 117, and the at least one lateral surface 115. The unaffected underlying portion of the PCD layer 106 is labeled 106" in FIG. 1B. For example, the leaching may be performed by exposing at least the PCD layer 106 to an acid (e.g., hydrochloric acid, hydrofluoric acid, nitric acid, or mixtures of the foregoing acids) and/or a gas (e.g., carbon monoxide) for a sufficient time. For example, a leach depth for the leached region 106' may be about 50 µm to about 700 µm, about 250 µm to about 400 µm, about 250 µm to about 350 µm, about 250 µm to about 300 µm, about 250 µm to about 275 µm, or about 500 µm to about 1000 µm. Depending on the leach depth and whether the underlying transition layer 104 is exposed to the leaching acid, in some embodiments, the leached region 106' may also extend into the transition layer 104. After leaching, the metal-solvent catalyst may be present in the leached region 106' of the PCD layer 106 in amount of about 2 wt % or less, about 0.8 wt % to about 1.50 wt %, or about 0.86 wt % to about 1.47 wt %. To measure the magnetic properties of the unaffected underlying portion 106" of the PCD layer 106, the leached region 106' should be removed along with the transition layer 104 and the substrate 102.

Figure 2:
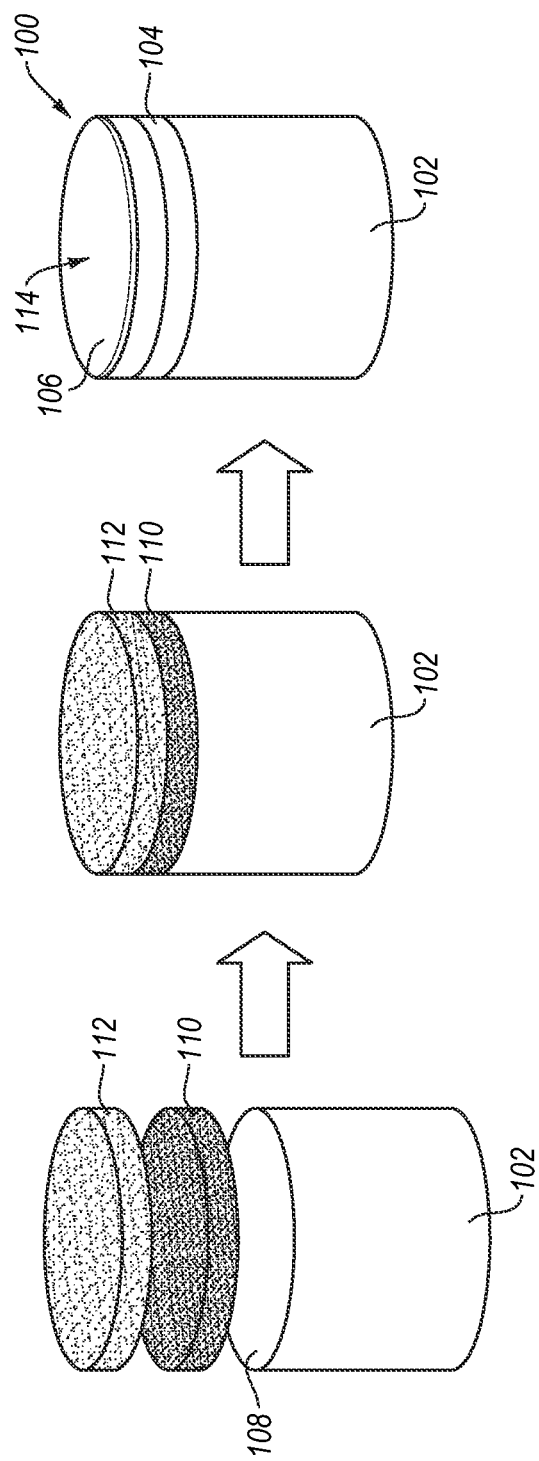
FIG. 2 is a schematic diagram illustrating a method for fabricating the PDC shown in FIG. 1A according to an embodiment.

FIG. 2 is a schematic illustration of an embodiment of a method for fabricating the PDC 100 shown in FIG. 1A. Referring to FIG. 2, a transition-layer mixture 110 is positioned adjacent to the interfacial surface 108 of the substrate 102 and at least one layer of diamond particles 112 is positioned adjacent to the transition-layer mixture 110. Although FIG. 2 shows the interfacial surface 108 of the substrate 102 as being substantially planar, the interfacial surface 108 may exhibit a selected non-planar topography, such as a grooved, ridged, or other non-planar interfacial surface.

The at least one layer of diamond particles 112 may exhibit an average particle size of about 50 µm or less, such as about 30 µm or less or about 20 µm or less. For example, the average particle size of the diamond particles may be about 10 µm to about 18 µm and, in some embodiments, about 15 µm to about 18 µm. In some embodiments, the average particle size of the diamond grains may be about 10 µm or less, such as about 2 µm to about 5 µm or submicron. The diamond particles size distribution of the diamond particles may exhibit a single mode, or may be a bimodal or greater grain size distribution. The transition-layer mixture 110 includes an intermixed blend of a plurality of diamond particles and at least one additive. Suitable examples for the at least one additive include, but are not limited to, tungsten carbide, chromium carbide, cubic boron nitride, combinations thereof, or the like. The amount of the at least one additive present in the transition-layer mixture 110 may be about 1 vol % to about 80 vol % of the transition layer 104, such as about 1 vol % to about 50 vol %, about 1 vol % to about 5 vol %, about 2 vol % to about 5 vol %, about 1 vol % to about 10 vol %, about 3 vol % to about 10 vol %, about 2 vol % to about 10 vol %, about 10 vol % to about 25 vol %, about 25 vol % to about 50 vol %, or about 10 vol % to about 25 vol %, with the balance substantially being diamond particles.

The substrate 102 may include a metal-solvent catalyst (e.g., cobalt) therein. The at least one layer of diamond particles 112, the transition-layer mixture 110, and the substrate 102 may be subjected to an HPHT process using HPHT conditions previously described. The PDC 100 so-formed includes the PCD layer 106 integrally formed with the transition layer 104 and the substrate 102. The transition layer 104 is bonded to the interfacial surface 108 of the substrate 102 and, in turn, the PCD layer 106 is bonded to the transition layer 104.

The substrate 102, the transition-layer mixture 110, and at least one layer of diamond particles 112 may be arranged in a pressure transmitting medium to form a cell assembly. The cell assembly with the pressure transmitting medium enclosing the substrate 102, the transition-layer mixture 110, and the at least one layer of diamond particles 112 disposed therein may be subjected to an HPHT process using an ultra-high pressure press at a temperature of at least about 1000° C. (e.g., about 1100° C. to about 2200° C., or about 1200° C. to about 1450° C.) and a pressure in the pressure transmitting medium of at least about 7.5 GPa (e.g., about 7.5 GPa to about 15 GPa) for a time sufficient to sinter the diamond particles together in the presence of the metal-solvent catalyst to form the PCD layer 106 and the transition layer 104 from the transition-layer mixture 110 that bonds the PCD layer 106 to the substrate 102.

In order to efficiently sinter the diamond particles of the at least one layer of diamond particles 112 and the transition-layer mixture 110, the substrate 102, the transition-layer mixture 110, and the at least one layer of diamond particles 112 may be enclosed in a pressure transmitting medium, such as a refractory metal can, graphite structure, pyrophyllite, or other suitable pressure transmitting structure to form the cell assembly. Examples of suitable gasket materials and cell structures for use in manufacturing PDCs are disclosed in U.S. Pat. No. 6,338,754 and U.S. patent application Ser. No. 11/545,929, each of which is incorporated herein, in its entirety, by this reference. Another example of a suitable pressure transmitting material is pyrophyllite, which is commercially available from Wonderstone Ltd. of South Africa. The cell assembly, including the contents therein, may subjected to an HPHT process using an ultra-high pressure press at a temperature of at least about 1000° C. (e.g., about 1100° C. to about 2200° C., or about 1200° C. to about 1450° C.) and a pressure in the pressure transmitting medium of at least about 7.5 GPa (e.g., about 7.5 GPa to about 15 GPa) for a time sufficient to sinter the diamond particles of the at least one layer of diamond particles 112 together in the presence of the metal-solvent catalyst to form the PCD layer 106 and sinter the transition-layer mixture 110 together to form the transition layer 104 that bonds the PCD layer 106 to the substrate 102. The PCD layer 106 so formed includes a matrix of PCD comprising bonded diamond grains defining interstitial regions occupied by the metal-solvent catalyst. For example, the pressure in the pressure transmitting medium employed in the HPHT process may be at least about 8.0 GPa, at least about 9.0 GPa, at least about 10.0 GPa, at least about 11.0 GPa, at least about 12.0 GPa, or at least about 14 GPa.

The pressure values employed in the HPHT processes disclosed herein refer to the pressure in the pressure transmitting medium at room temperature (e.g., about 25° C.) with application of pressure using an ultra-high pressure press and not the pressure applied to the exterior of the cell assembly. The actual pressure in the pressure transmitting medium at sintering temperature may be slightly higher. The ultra-high pressure press may be calibrated at room temperature by embedding at least one calibration material that changes structure at a known pressure such as, PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

In an embodiment, a pressure of at least about 7.5 GPa in the pressure transmitting medium may be generated by applying pressure to a cubic high-pressure cell assembly that encloses the substrate 102, the transition-layer mixture 110, and the at least one layer of diamond particles 112 using anvils, with each anvil applying pressure to a different face of the cubic high-pressure assembly. In such an embodiment, a surface area of each anvil face of the anvils may be selectively dimensioned to facilitate application of pressure of at least about 7.5 GPa to the cell assembly. For example, the surface area of each anvil may be less than about 12.0 $cm^2$, such as about 8 $cm^2$ to about 10 $cm^2$. The anvils may be made from a cobalt-cemented tungsten carbide or other material having a sufficient compressive strength to help reduce damage thereto through repetitive use in a high-volume commercial manufacturing environment. Optionally, as an alternative to or in addition to selectively dimensioning the surface area of each anvil face, two or more internal anvils may be embedded in the cubic high-pressure cell assembly to further intensify pressure. For example, the article W. Utsumi, N. Toyama, S. Endo and F. E. Fujita, "X-ray diffraction under ultra-high pressure generated with sintered diamond anvils," J. Appl. Phys., 60, 2201 (1986) is incorporated herein, in its entirety, by this reference and discloses that sintered diamond anvils may be embedded in a cubic pressure transmitting medium for intensifying the pressure applied by an ultra-high pressure press to a workpiece also embedded in the cubic pressure transmitting medium.

If the substrate 102 includes a metal-solvent catalyst (e.g., cobalt in a cobalt-cemented tungsten carbide substrate), the metal-solvent catalyst therein may liquefy and infiltrate the transition-layer mixture 110 and the at least one layer of diamond particles 112 to promote growth between adjacent diamond particles of the at least one layer of diamond particles 112 and the transition-layer mixture 110 to form the PCD layer 106 and the transition layer 104. For example, if the substrate 102 is a cobalt-cemented tungsten carbide substrate, cobalt from the substrate 102 may be liquefied and infiltrate the at least one layer of diamond particles 112 and the transition-layer mixture 110 to catalyze formation of diamond-to-diamond bonding in at least the PCD layer 106. Depending upon the volume % of the at least one additive in the transition-layer mixture 110, the transition layer 104 so-formed may also exhibit diamond-to-diamond bonding between the diamond grains thereof when the volume % of the at least one additive is relatively low and may exhibit limited or substantially no diamond-to-diamond bonding when the volume % of the at least one additive is relatively high.

Employing selectively dimensioned anvil faces and/or internal anvils in the ultra-high pressure press used to process the at least one layer of diamond particles 112 and the transition-layer mixture 110 and substrate 102 enables forming the at least one lateral dimension "d" of the PCD layer 106 to be about 0.80 cm or more. Referring again to FIG. 1A, for example, at least one lateral dimension "d" may be about 0.80 cm to about 3.0 cm and, in some embodiments, about 1.3 cm to about 1.9 cm or about 1.6 cm to about 1.9 cm. A representative volume of the PCD layer 106 formed using the selectively dimensioned anvil faces and/or internal anvils may be at least about 0.050 $cm^3$. For example, the volume may be about 0.25 $cm^3$ to at least about 1.25 $cm^3$ or about 0.1 $cm^3$ to at least about 0.70 $cm^3$. A representative volume for the PDC 100 may be about 0.4 $cm^3$ to at least about 4.6 $cm^3$, such as about 1.1 $cm^3$ to at least about 2.3 $cm^3$.

In other embodiments, a PCD layer according to an embodiment may be separately formed using a HPHT sintering process and, subsequently, bonded to the transition layer 104 by brazing, using a separate HPHT bonding process, or any other suitable joining technique, without limitation. For example, the PCD layer so-formed may be leached to remove substantially all of the metal-solvent catalyst therefrom and bonded to the transition layer 104 during or after formation of the transition layer 104. In an embodiment, the leached PCD layer may be bonded to the transition layer 104 in an HPHT process during or after formation of the transition layer 104, and a metallic infiltrant (e.g., cobalt from a cobalt-cemented tungsten carbide substrate) may infiltrate into the leached PCD layer during the HPHT process. In a further embodiment, the metallic infiltrant may be leached from the infiltrated PCD layer to a selected depth from an exterior working surface thereof. In yet another embodiment, a substrate may be formed by depositing a binderless carbide (e.g., tungsten carbide via chemical vapor deposition) onto the separately formed PCD layer and transition layer.

In some embodiments, at least the PCD layer 106 shown in FIG. 2 may be leached to deplete a portion of the metal-solvent catalyst therein and form the leached region 106' shown in FIG. 1B. For example, the leaching may be performed by exposing at least the PCD layer 106 to an acid (e.g., hydrochloric acid, hydrofluoric acid, nitric acid, or mixtures of the foregoing acids) and/or a gas (e.g., carbon monoxide) for a sufficient time. Depending on the leach depth and whether the underlying transition layer 104 is exposed to the leaching acid, in some embodiments, the leached region 106' may also extend into the transition layer 104.

Figure 3:
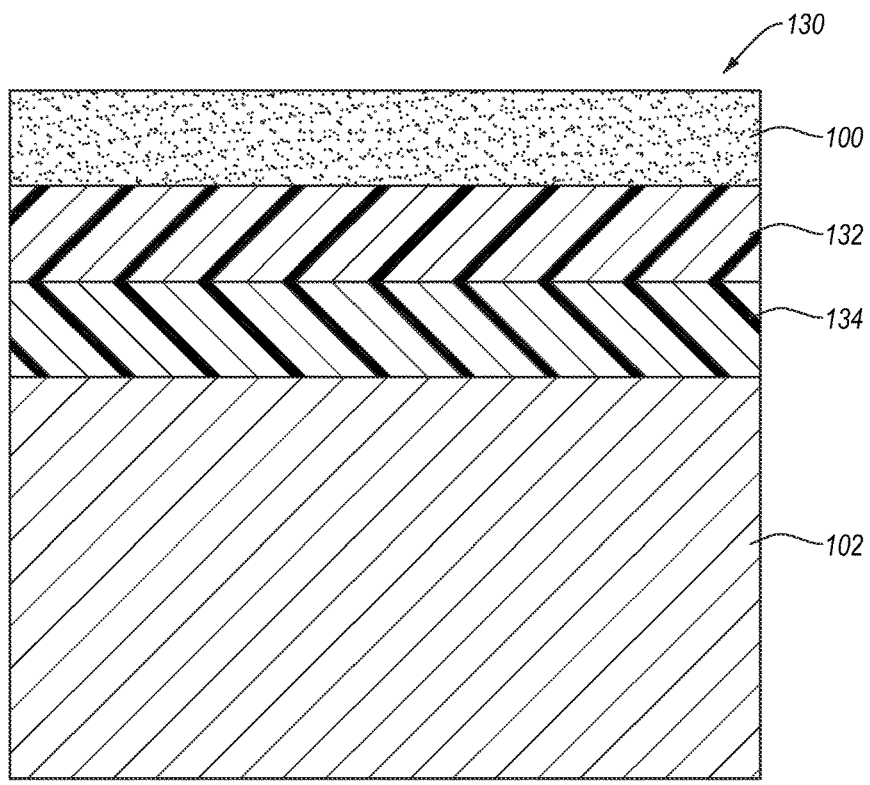
FIG. 3 is a side cross-sectional view of an assembly for forming a PDC according to another embodiment.

Although the PDC 100 illustrated in FIG. 1A includes only one transition layer 104, in other embodiments, a PDC may include more than two or more transition layers. Referring to FIG. 3, an assembly 130 includes the substrate 102, at least one layer of diamond particles 112, a first transition-layer mixture 132 adjacent to the layer of diamond particles 112, and a second transition-layer mixture 134 adjacent to the substrate 102. In an embodiment, the first transition-layer mixture 132 may include less of the at least one additive and more diamond particles than that of the second transition-layer mixture 134 adjacent to the substrate 102. In an embodiment, when the substrate 102 is fabricated from cemented tungsten carbide, the at least one additive in the first transition-layer mixture 132 may include a mixture of tungsten-carbide particles, cemented tungsten carbide particles, or the like in an amount of about 25 vol % and diamond particles in an amount of about 75 vol %, and the second transition-layer mixture 134 may include a mixture of tungsten-carbide particles in an amount of about 50 vol % and diamond particles in an amount of about 50 vol %. A metal-solvent catalyst, such as cobalt, nickel, iron, or an Invar®-type iron-nickel alloy, may also be intentionally mixed to the first and second transition-layer mixtures 132 and 134 in particulate form.

Figure 4:
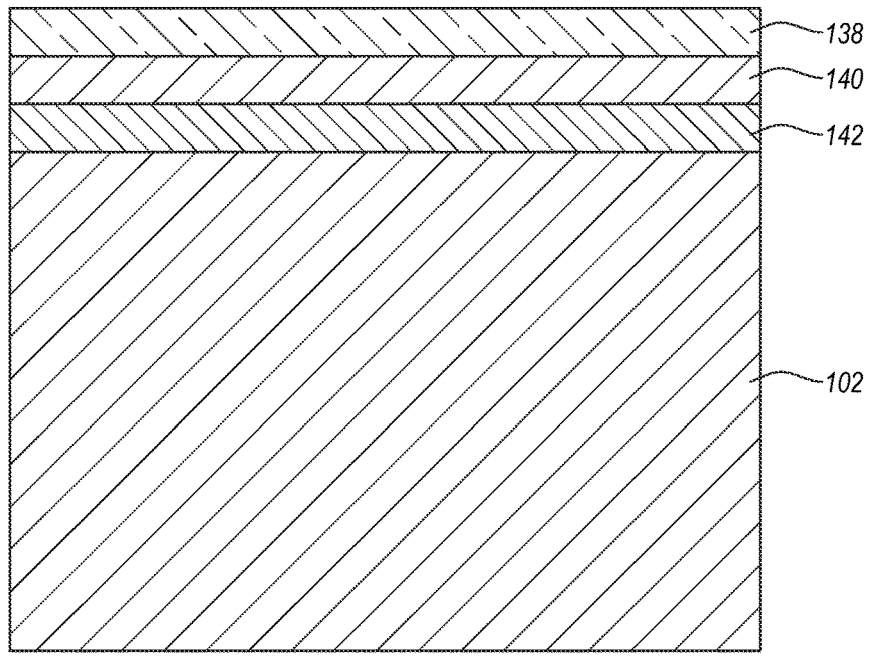
FIG. 4 is a side cross-sectional view of the PDC formed by HPHT sintering the assembly shown in FIG. 3.

Referring to FIG. 4, after HPHT processing of the assembly 130 using any of the HPHT conditions disclosed herein, a PDC 136 is formed. The PDC 136 includes at least one PCD layer 138 that includes a plurality of directly bonded-together diamond grains bonded to a first transition layer 140 that includes at least one additive, diamond grains, and metal-solvent catalyst. A second transition layer 142 is bonded to the first transition layer 140 and to the substrate 102, and also may include at least one additive, diamond grains, and metal-solvent catalyst. During HPHT sintering, metal-solvent catalyst from the substrate 102 (e.g., cobalt from a cobalt-cemented tungsten carbide substrate) or another source sweeps into the first and second transition-layer mixtures 132 and 134 to cement the constituents thereof together. If the first transition layer 140 includes relatively more diamond grains and less of the at least one additive than that of the second transition layer 142, the residual stress gradient between the substrate 102 and the PCD layer 138 may be reduced. Other formulations for the transition-layer mixtures 132, 134 and the resulting transition layers 140, 142 may be selected to reduce the residual stress gradient between the substrate 102 and the PCD layer 138 and/or facilitate bonding between regions comprising differing materials. In some embodiments, at least the PCD layer 138 may be leached to at least partially remove the metal-solvent catalyst present in the PCD layer 138 to a selected depth similar to the embodiment illustrated in FIG. 1B.

Figure 5:
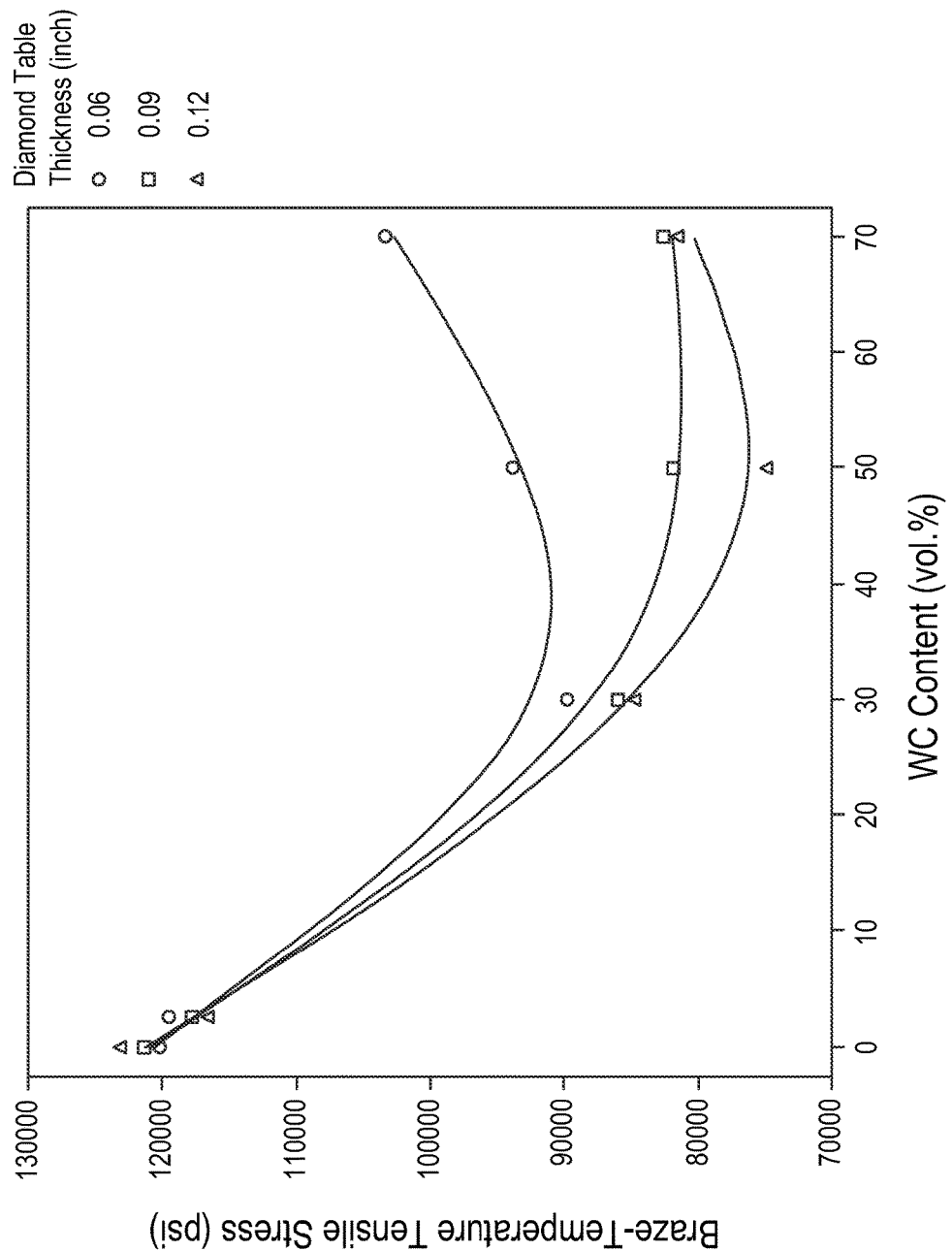
FIG. 5 illustrates finite element modeling results showing reduced braze-temperature tensile stresses in the PCD layer of the PDC shown in FIG. 1A when the tungsten carbide content is varied in the translation layer according to various embodiments.

Referring now to FIG. 5, the effect on the maximum tensile stresses generated in the PCD layer 106 as a function of increasing tungsten-carbide content in the transition layer 104 of the PDC 100 in FIG. 1A is illustrated. Specifically, FIG. 5 illustrates finite element modeling results showing reduced stress in the PCD layer 106 of the PDC 100 formed by an HPHT process with increasing tungsten-carbide content in the transition layer 104 disposed between and bonded to the substrate 102 and the PCD layer 106.

The finite element model models a maximum tensile stress in the PCD layer 106 of the PDC 100 when the substrate 102 is a cobalt-cemented tungsten carbide ("WC—Co") substrate and the PCD layer 106 and transition layer 104 are of equal thicknesses. The transition layer 104 adjacent the WC—Co substrate 102 is a mixture of diamond and WC particles (i.e., pure WC particles). The volume percent of WC is listed on the graph. The PCD layer 106 is substantially free of WC particles. In the model, the PCD layer 106 was modeled as 100% diamond. Data was generated for three different thickness of the PCD layer 106 and the transition layer 104, which is listed on the graph (0.060-inch, 0.090-inch, and 0.120-inch). The y-axis of the graph shows the maximum tensile stress in the PCD layer 106 at a simulated brazing temperature of approximately 720° C. As can be seen from FIG. 5, the maximum braze-temperature tensile stress (i.e., the principal stress) generated during brazing of the PDC 100 to another structure is significantly reduced when the transition layer 104 includes about 25 vol % to about 50 vol % WC for the at least one additive. As the maximum braze-temperature tensile stress is significantly reduced, damage in the PCD layer 106 during brazing of the PDC 100 may be reduced or eliminated.

Finite element models of so-called standard PDCs have shown the maximum braze-temperature tensile stress to be about 82,000 psi. Standard PDCs are fabricated, for example, in an HPHT process at a pressure of 5-6 GPa and a temperature of about 1400° C. In contrast, the high-pressure fabricated PDCs described herein are fabricated at a pressure of at least 7.5 GPa and a temperature of at least 1000° C. High-pressure fabricated PDCs lacking a transition layer (i.e., 0 vol % WC in FIG. 5) have a braze temperature tensile stress of about 120,000 psi. Standard PDCs are generally less susceptible to brazing damage because they exhibit lower braze-temperature tensile stresses when compared to PDCs that are sintered at higher pressure.

As can be seen from FIG. 5, addition of the transition layer 104 significantly reduces the braze-temperature tensile stress of a high-pressure fabricated PDC. For example, addition of a transition layer that contains about 25 vol % to about 50 vol % WC reduces the braze temperature tensile stress in a PCD layer having thickness of about 0.09 inch to about 90,000 psi at 25 vol % WC and to about 82,000 psi at 50 vol % WC. This is in the range of braze-temperature tensile stress values seen for standard-pressure PDCs.

Figure 6:
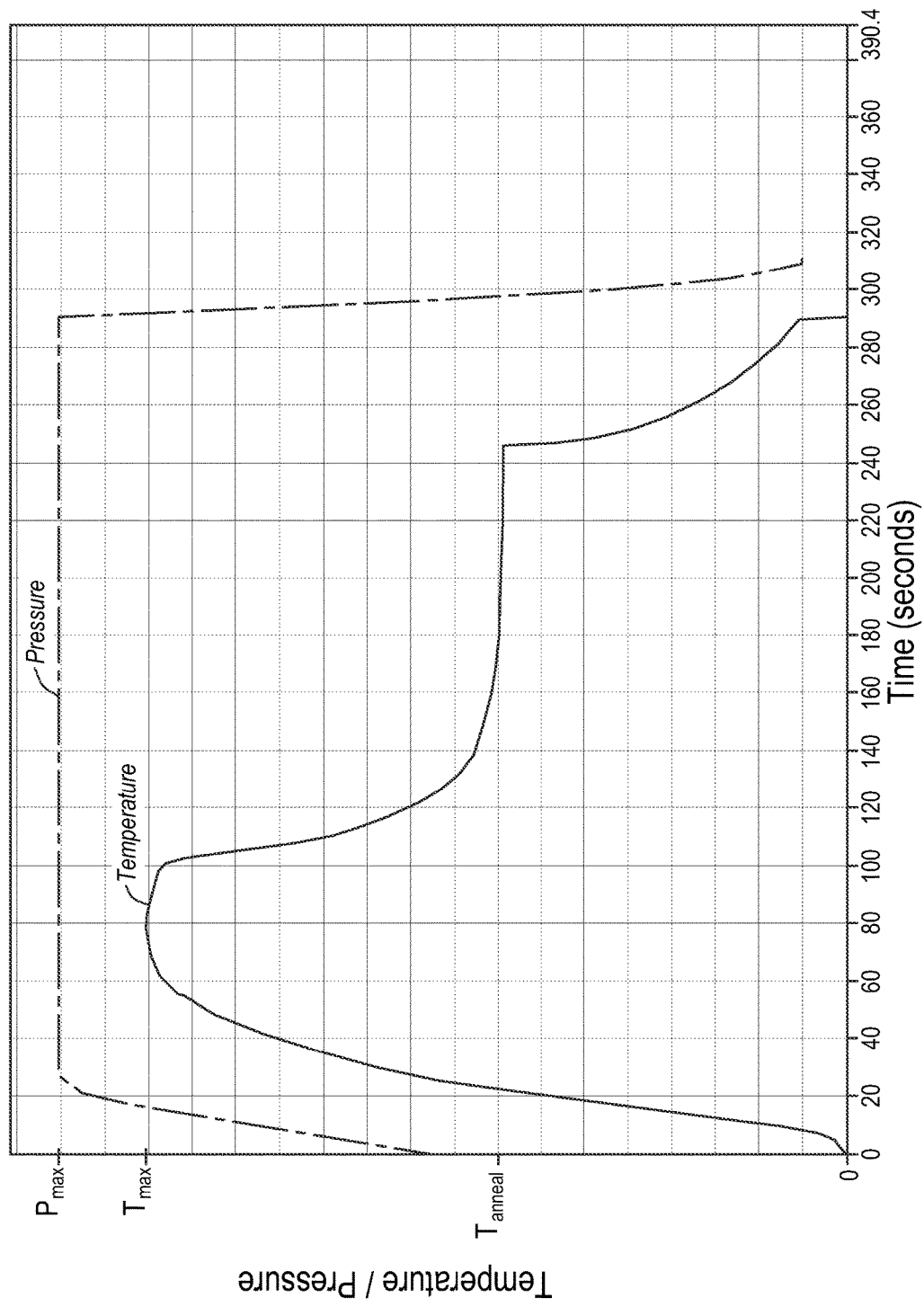
FIG. 6 illustrates a method for fabricating a PDC that includes high pressure annealing according to an embodiment.

As an alternative to or in addition to the use of at least one transition layer for stress management in a PDC, in some embodiments, LME-type damage and braze-temperature induced damage may also be reduced in the PDCs described herein by annealing after the HPHT sintering process. Referring now to FIG. 6, an embodiment of an HPHT process for fabricating a PDC is illustrated. The HPHT process includes an HPHT processing step followed by a high-pressure annealing step at a relatively lower temperature. In the process illustrated in FIG. 6, the cell assembly including the substrate, an optional at least one layer of transition-layer mixture, and a layer of diamond particles are arranged in a pressure cell. In a first step, the pressure and the temperature are ramped up to a temperature and pressure suitable (e.g., about 1500° C. at a pressure of about 8 GPa) for forming the PDC. In the illustrated embodiment, the pressure is maintained at a maximum pressure $P_{max}$ while the sintering temperature $T_{max}$ is maintained for about 40 seconds. In a second step, the temperature is lowered to a temperature suitable for annealing (e.g., about 800° C.) while holding the pressure approximately constant at $P_{max}$. In the illustrated embodiment, the annealing temperature $T_{anneal}$ is maintained for about 80 seconds. Finally, the temperature is ramped down and the pressure is released once the temperature has been sufficiently lowered. The times and temperatures described for the high-pressure annealing process are merely illustrative and other values may be employed. For example, in other embodiments, the annealing may be performed at a temperature in a range of about 650° C. to about 875° C. at a pressure of about 5 GPa to about 10 GPa (e.g., about 5 GPa to about 7 GPa) provided that diamond-stable HPHT conditions are maintained.

Figure 7:
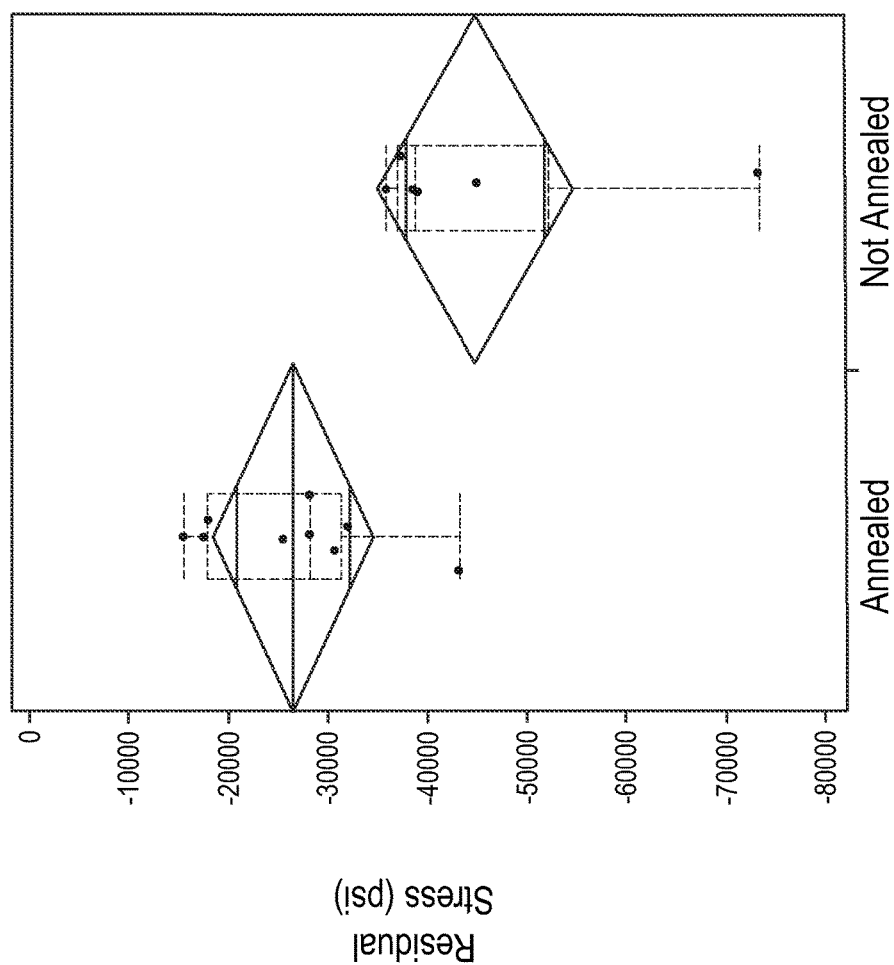
FIG. 7 illustrates a comparison between the residual stress in an un-annealed PDC and a PDC annealed using a low pressure annealing process.

In another embodiment for the annealing process, a PDC may be annealed at atmospheric pressure or under partial vacuum (e.g., about $10^{-5}$ torr to about $10^{-3}$ torr). In an embodiment, annealing may be performed at a temperature of about 650° C. to about 900° C. to about for about 5 to about 30 minutes at atmospheric pressure or under partial vacuum. Results of such a process are illustrated in FIG. 7. FIG. 7 compares measured residual compressive stress values at room temperature for unannealed and annealed PDCs with 0.070-inch thick PCD tables without a transition layer. Residual compressive stress was measured at the center of the PCD table on the working surface. As can be seen, annealing reduces the residual compressive stress in the PCD layer.

The residual compressive stress in the PCD layer or table that is relieved by the annealing process described in relation to FIGS. 6 and 7 is a result of the mismatch between the substrate having a relatively high CTE and the PCD layer having a relatively low CTE. The annealing process occurs at temperatures approximately the same as those used to braze the PDCs to another structure, such as a drill bit body. The cobalt cementing constituent of the cobalt-cemented tungsten carbide substrate softens (e.g., reducing of the yield stress) during the annealing process such that the body forces present in the PDC deform the substrate near the interfacial surface between the substrate and the PCD layer or table. Consequently, the substrate exerts less thermal-induced tensile stress on the PCD layer or table when the substrate expands at braze temperature as compared unannealed PDCs.

The residual compressive stresses in the PCD layer or table of the PDC so-formed may be controlled by adjusting the cooling rate from $T_{max}$ at which sintering of the diamond particles occurs. It is currently believed that the PCD layer or table exhibits relatively higher the residual compressive stresses when the cooling rate from $T_{max}$ is relatively faster. In some embodiments in which higher residual compressive stresses in the PCD layer or table are desired, the annealing step may be omitted and the PDC may be rapidly cooled from $T_{max}$ during the HPHT process by adjusting the electrical power (e.g., to zero power) to the heater in the cell assembly that heats the PDC constituents being HPHT processed.

Figure 9:
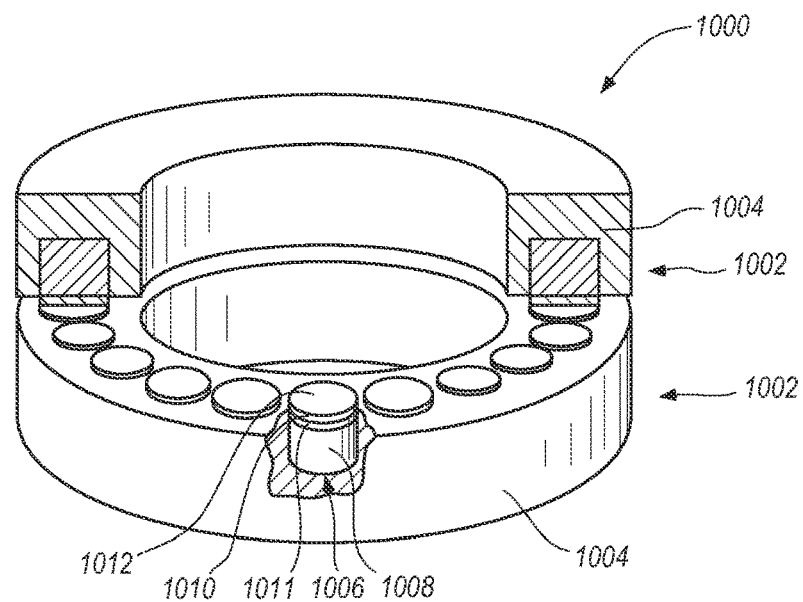
FIG. 9 is an isometric cut-away view of an embodiment of a thrust-bearing apparatus that may utilize one or more of the disclosed PDC embodiments.
Figure 10:
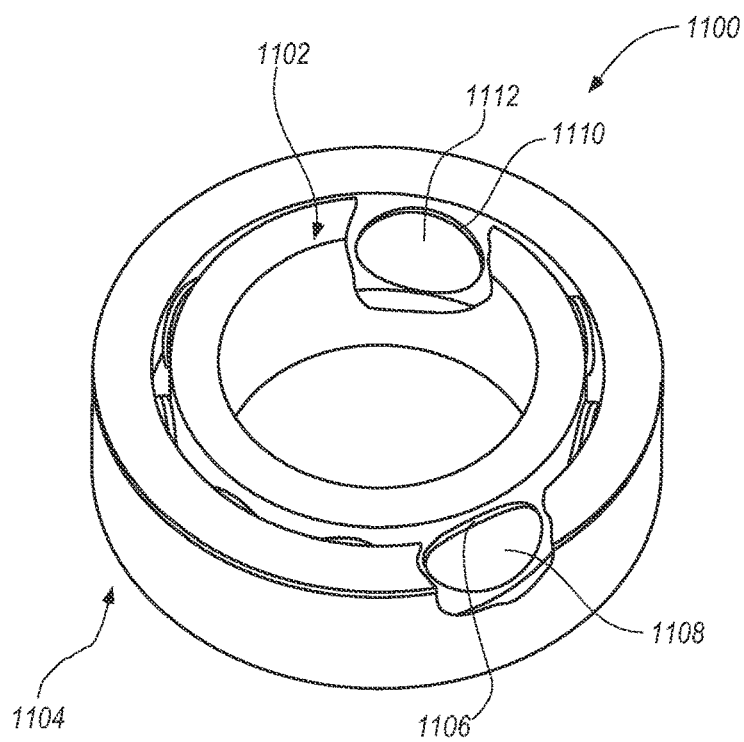
FIG. 10 is an isometric cut-away view of an embodiment of a radial bearing apparatus that may utilize one or more of the disclosed PDC embodiments.

The disclosed PDC embodiments may be used in a number of different applications including, but not limited to, use in a rotary drill bit (FIGS. 8A and 8B), a thrust-bearing apparatus (FIG. 9), and a radial bearing apparatus (FIG. 10). The various applications discussed above are merely some examples of applications in which the PDC embodiments may be used. Other applications are contemplated, such as employing the disclosed PDC embodiments in wire-drawing dies and friction stir welding tools.

Figure 8A:
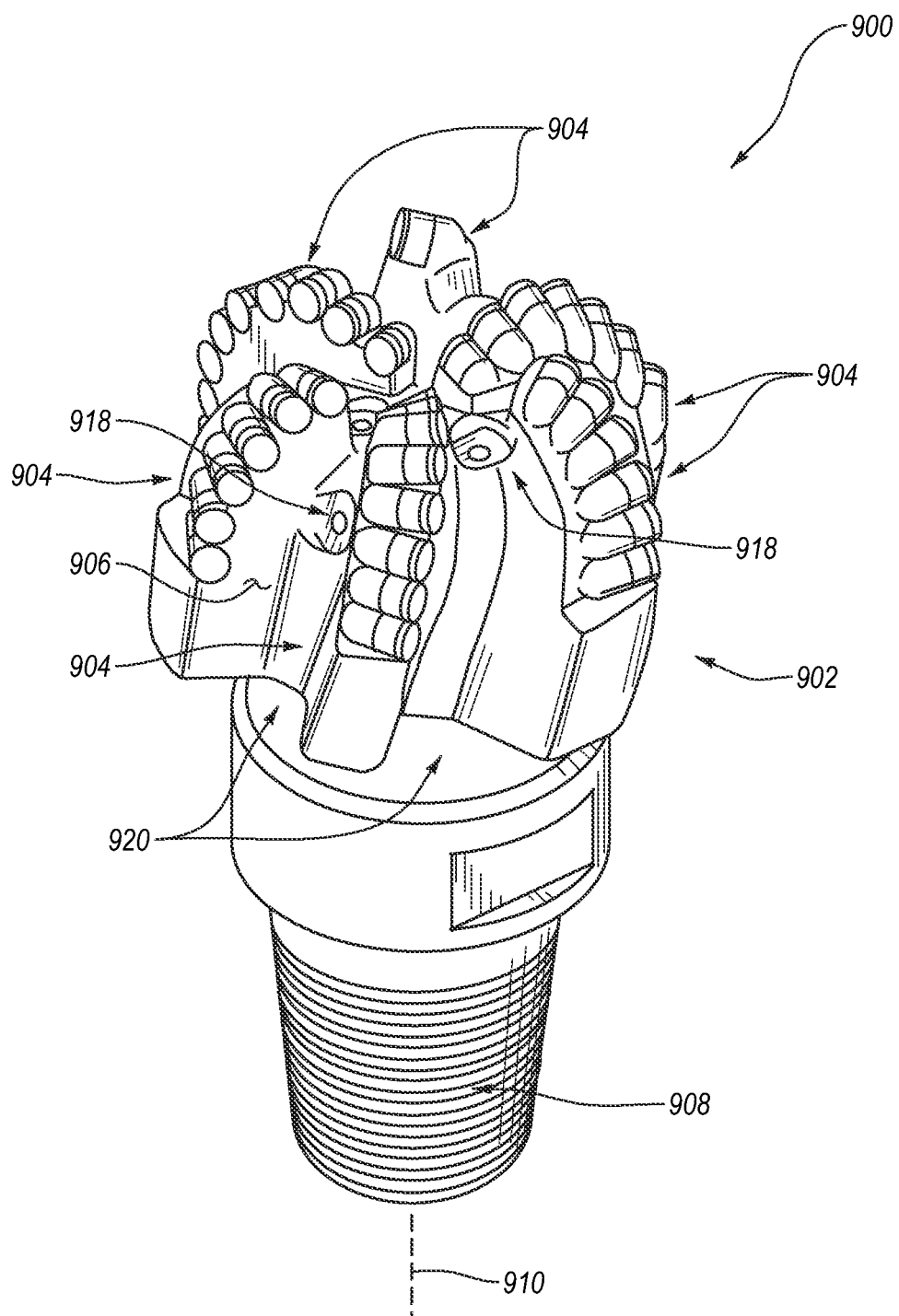
FIG. 8A is an isometric view of an embodiment of a rotary drill bit that may employ one or more of the disclosed PDC embodiments.
Figure 8B:
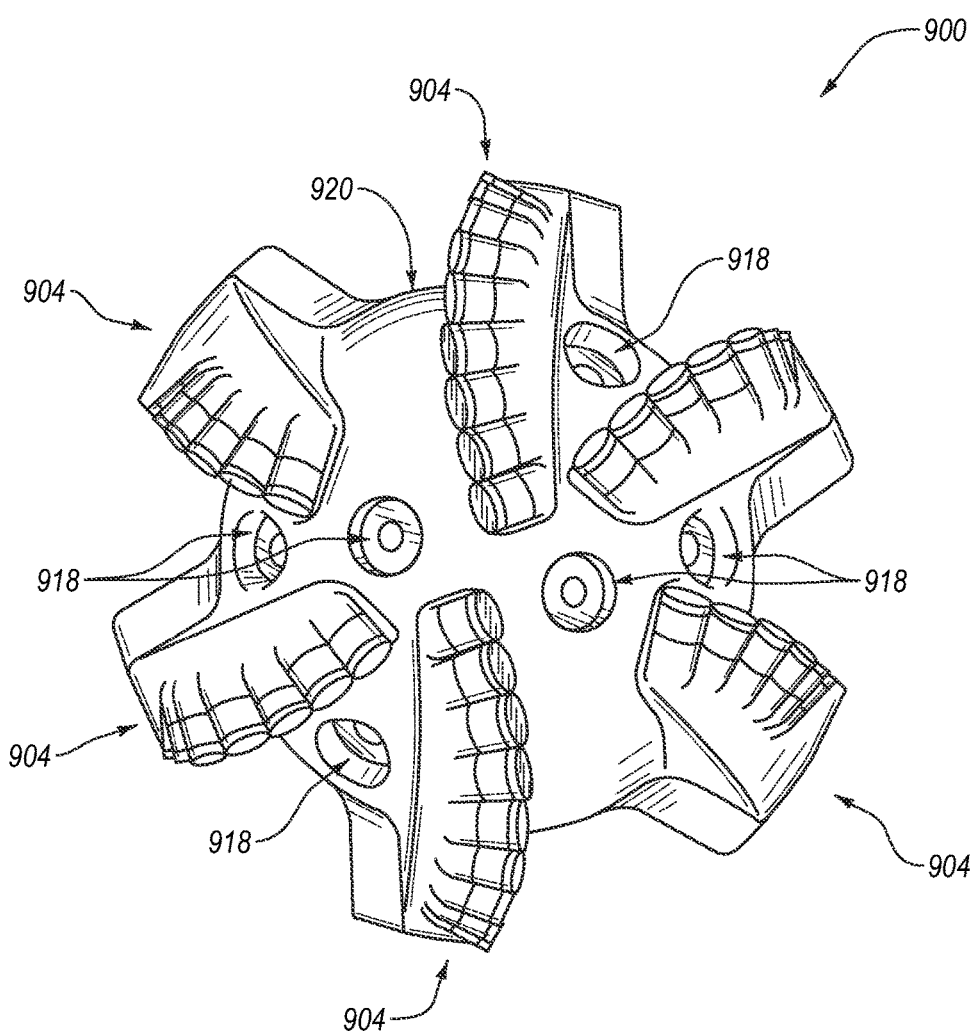
FIG. 8B is a top elevation view of the rotary drill bit shown in FIG. 8A.

FIG. 8A is an isometric view and FIG. 8B is a top elevation view of an embodiment of a rotary drill bit 900. The rotary drill bit 900 includes at least one PDC configured according to any of the previously described PDC embodiments. The rotary drill bit 900 comprises a bit body 902 that includes radially and longitudinally extending blades 904 with leading faces 906, and a threaded pin connection 908 for connecting the bit body 902 to a drilling string. The bit body 902 defines a leading end structure for drilling into a subterranean formation by rotation about a longitudinal axis 910 and application of weight-on-bit. At least one PDC cutting element, configured according to any of the previously described PDC embodiments (e.g., the PDC 100 shown in FIG. 1A), may be affixed to the bit body 902. Each of a plurality of PDCs 912 is secured to the blades 904. For example, each PDC 912 may include a PCD layer and a transition layer bonded to a substrate. More generally, the PDCs 912 may comprise any PDC disclosed herein, without limitation. In addition, if desired, in some embodiments, a number of the PDCs 912 may be conventional in construction. Also, circumferentially adjacent blades 904 define so-called junk slots 920 therebetween, as known in the art. Additionally, the rotary drill bit 900 may include a plurality of nozzle cavities 918 for communicating drilling fluid from the interior of the rotary drill bit 900 to the PDCs 912.

FIGS. 8A and 8B merely depict an embodiment of a rotary drill bit that employs at least one cutting element comprising a PDC fabricated and structured in accordance with the disclosed embodiments, without limitation. The rotary drill bit 900 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PCD and/or PDCs disclosed herein (e.g., the PDC 100 shown in FIG. 1A) may also be utilized in applications other than rotary drill bits. For example, the disclosed PDC embodiments may be used in thrust-bearing assemblies, radial bearing assemblies, wire-drawing dies, artificial joints, machining elements, and heat sinks.

FIG. 9 is an isometric cut-away view of an embodiment of a thrust-bearing apparatus 1000, which may utilize any of the disclosed PDC embodiments as bearing elements. The thrust-bearing apparatus 1000 includes respective thrust-bearing assemblies 1002. Each thrust-bearing assembly 1002 includes an annular support ring 1004 that may be fabricated from a material, such as carbon steel, stainless steel, or another suitable material. Each support ring 1004 includes a plurality of recesses (not labeled) that receives a corresponding bearing element 1006. Each bearing element 1006 may be mounted to a corresponding support ring 1004 within a corresponding recess by brazing, press-fitting, using fasteners, or another suitable mounting technique. One or more, or all of bearing elements 1006 may be configured according to any of the disclosed PDC embodiments. For example, each bearing element 1006 may include a substrate 1008, a PCD layer 1010, and at least one transition layer (not shown) disposed between the substrate 1008 and the PCD layer 1010. The PCD layer 1010 includes a bearing surface 1012.

In use, the bearing surfaces 1012 of one of the thrust-bearing assemblies 1002 bear against the opposing bearing surfaces 1012 of the other one of the bearing assemblies 1002. For example, one of the thrust-bearing assemblies 1002 may be operably coupled to a shaft to rotate therewith and may be termed a "rotor." The other one of the thrust-bearing assemblies 1002 may be held stationary and may be termed a "stator."

FIG. 10 is an isometric cut-away view of an embodiment of a radial bearing apparatus 1100, which may utilize any of the disclosed PDC embodiments as bearing elements. The radial bearing apparatus 1100 includes an inner race 1102 positioned generally within an outer race 1104. The outer race 1104 includes a plurality of bearing elements 1110 affixed thereto that have respective bearing surfaces 1112. The inner race 1102 also includes a plurality of bearing elements 1106 affixed thereto that have respective bearing surfaces 1108. One or more, or all of the bearing elements 1106 and 1110 may be configured according to any of the PDC embodiments disclosed herein. The inner race 1102 is positioned generally within the outer race 1104 and, thus, the inner race 1102 and outer race 1104 may be configured so that the bearing surfaces 1108 and 1112 may at least partially contact one another and move relative to each other as the inner race 1102 and outer race 1104 rotate relative to each other during use.

The radial-bearing apparatus 1100 may be employed in a variety of mechanical applications. For example, so-called "roller cone" rotary drill bits may benefit from a radial-bearing apparatus disclosed herein. More specifically, the inner race 1102 may be mounted to a spindle of a roller cone and the outer race 1104 may be mounted to an inner bore formed within a cone and that such an outer race 1104 and inner race 1102 may be assembled to form a radial-bearing apparatus.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A method for manufacturing a polycrystalline diamond compact, the method comprising:
disposing at least one mixture layer that includes a plurality of diamond particles and at least one additive between a layer of diamond particles and a cemented carbide substrate in a pressure transmitting medium to form a cell assembly;
subjecting the cell assembly to a high-temperature/high-pressure ("HPHT") process to form a polycrystalline diamond compact that includes at least one polycrystalline diamond layer, a cemented carbide substrate, and at least one transition layer disposed between the at least one polycrystalline diamond layer and the cemented carbide substrate;
ramping a sintering temperature of the HPHT process down to an annealing temperature over at least 70 seconds; and
annealing the polycrystalline diamond compact after the HPHT process at the annealing temperature in a range of about 650° C. to about 875° C. and a pressure of about 2 GPa to about 10 GPa;
wherein the at least one transition layer is at least partially formed from the at least one mixture layer, and wherein the at least one transition layer exhibits a coefficient of thermal expansion ("CTE") that is less than a CTE of the cemented carbide substrate and greater than a CTE of the at least one polycrystalline diamond layer;
wherein the at least one polycrystalline diamond layer exhibits an average diamond grain size of about 30 μm or less, a coercivity of about 115 Oersteds ("Oe") or more and a specific magnetic saturation of about 15 Gauss·cm$^3$/grams ("G·cm$^3$/g") or less.

2. The method of claim 1 wherein the at least one polycrystalline diamond layer exhibits a coercivity of about 130 Oe to about 160 Oe and a specific magnetic saturation of about 10 G·cm$^3$/g to about 15 G·cm$^3$/g.

3. The method of claim 1 wherein subjecting the cell assembly to an HPHT process includes subjecting the cell assembly to the HPHT process at a temperature of about 1100° C. to about 2200° C. and a pressure of at least 8.0 GPa in the pressure transmitting medium.

4. The method of claim 1 wherein the at least one additive includes at least one member selected from the group consisting of tungsten carbide, chromium carbide, and cubic boron nitride.

5. The method of claim 1 wherein the at least one additive is about 25 volume % to about 50 volume % of the at least one transition layer.

6. The method of claim 1 wherein the at least one transition layer includes a plurality of diamond grains at least some of which exhibit diamond-to-diamond bonding.

7. The method of claim 1 wherein the at least one transition layer includes a plurality of diamond grains at least some of which exhibit substantially no diamond-to-diamond bonding.

8. A method for manufacturing a polycrystalline diamond compact, the method comprising:
disposing at least one mixture layer that includes a plurality of diamond particles and tungsten carbide particles between at least one layer of diamond particles and a cemented carbide substrate in a pressure transmitting medium to form a cell assembly; and
subjecting the cell assembly to a high-temperature/high-pressure ("HPHT") process of at least 1000° C. and a pressure of at least 7.5 GPa in the pressure transmitting medium to form a polycrystalline diamond compact that includes at least one polycrystalline diamond layer, a cemented carbide substrate, and at least one transition layer disposed between the at least one polycrystalline diamond layer and the cemented carbide substrate;
ramping a sintering temperature of the HPHT process down to an annealing temperature over at least 70 seconds; and
annealing the polycrystalline diamond compact after the HPHT process at the annealing temperature in a range of about 650° C. to about 875° C. and a pressure of about 2 GPa to about 10 GPa for at least about 80 seconds;
wherein the at least one transition layer is at least partially formed from the at least one mixture layer;
wherein the at least one transition layer exhibits a thickness of about 0.60 inches to about 0.12 inches and a coefficient of thermal expansion ("CTE") that is less than a CTE of the cemented carbide substrate and greater than a CTE of the at least one polycrystalline diamond layer;
wherein the at least one additive is about 25 volume % to about 50 volume % of the at least one transition layer;
wherein the at least one polycrystalline diamond layer exhibits a coercivity of about 115 Oersteds ("Oe") or more and a specific magnetic saturation of about 15 Gauss·cm$^3$/grams ("G·cm$^3$/g") or less.

9. The method of claim 8 wherein the at least one additive includes at least one member selected from the group consisting of tungsten carbide, chromium carbide, and cubic boron nitride.

10. The method of claim 8 wherein the at least one polycrystalline diamond layer is substantially free of the at least one additive.

11. The method of claim 8 wherein the at least one transition layer includes a plurality of diamond grains at least some of which exhibit diamond-to-diamond bonding.

12. The method of claim 8 wherein the at least one transition layer includes a plurality of diamond grains at least some of which exhibit substantially no diamond-to-diamond bonding.

13. The method of claim 8 wherein the at least one polycrystalline diamond layer exhibits a coercivity of about 115 Oe to about 175 Oe and a specific magnetic saturation of about 5 G·cm$^3$/g to about 15 G·cm$^3$/g.

14. The method of claim 8, wherein the at least one polycrystalline diamond layer exhibits a coercivity of about 130 Oe to about 160 Oe and a specific magnetic saturation of about 10 G·cm$^3$/g to about 15 G·cm$^3$/g.

15. The method of claim 8 wherein the at least one polycrystalline diamond layer exhibits a specific permeability less than about 0.10 G·cm$^3$/Oe·g.

16. The method of claim 8 wherein the at least one polycrystalline diamond layer exhibits a specific permeability of about 0.060 G·cm$^3$/Oe·g to about 0.090 G·cm$^3$/Oe·g.

17. A method for manufacturing a polycrystalline diamond compact, the method comprising:
disposing at least one mixture layer that includes a plurality of diamond particles and at least one additive between a layer of diamond particles and a cemented carbide substrate in a pressure transmitting medium to form a cell assembly;
subjecting the cell assembly to a high-temperature/high-pressure ("HPHT") process to form a polycrystalline diamond compact that includes at least one polycrystalline diamond layer, a cemented carbide substrate, and at least one transition layer disposed between the at least one polycrystalline diamond layer and the cemented carbide substrate;

annealing the polycrystalline diamond compact after the HPHT process at an annealing temperature in a range of about 650° C. to about 875° C. and a pressure of about 2 GPa to about 10 GPa;

wherein the at least one transition layer is at least partially formed from the at least one mixture layer, and wherein the at least one transition layer exhibits a coefficient of thermal expansion ("CTE") that is less than a CTE of the cemented carbide substrate and greater than a CTE of the at least one polycrystalline diamond layer;

wherein the at least one polycrystalline diamond layer exhibits a coercivity of about 115 Oersteds ("Oe") or more and a specific magnetic saturation of about 15 Gauss·cm$^3$/grams ("G·cm$^3$/g") or less.

18. The method of claim 17 wherein the at least one additive is about 1 volume % to about 80 volume % of the at least one transition layer.

19. The method of claim 17 wherein the at least one additive is about 25 volume % to about 50 volume % of the at least one transition layer.

20. The method of claim 17 wherein the at least one additive includes at least one member selected from the group consisting of tungsten carbide, chromium carbide, and cubic boron nitride.

* * * * *